July 31, 1962 E. P. BRINKEL 3,047,017
NON-TIE-DOWN VALVE
Filed Oct. 20, 1959
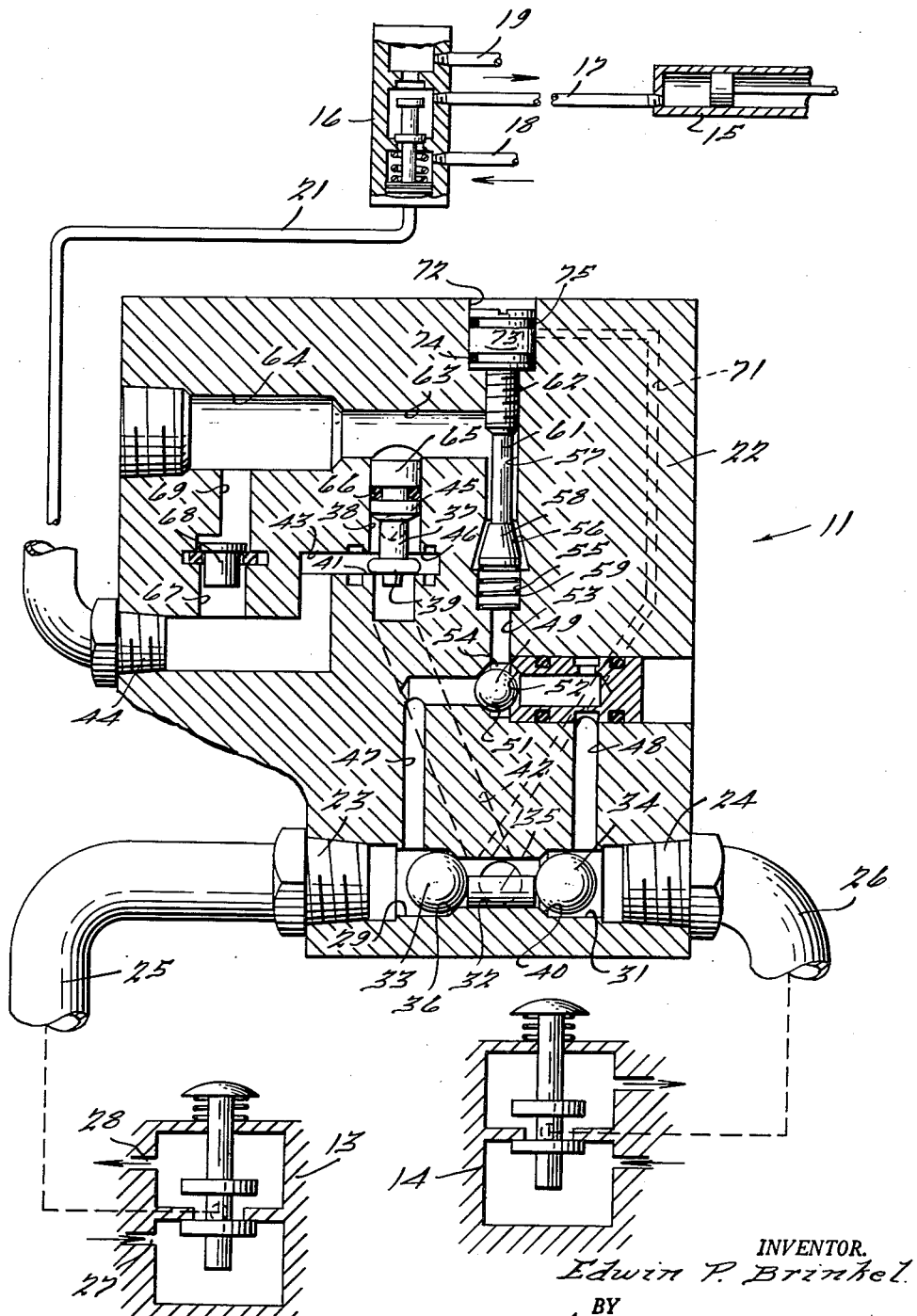
INVENTOR.
Edwin P. Brinkel
BY
Harness, Dickey & Pierce
ATTORNEYS.

United States Patent Office 3,047,017
Patented July 31, 1962

3,047,017
NON-TIE-DOWN VALVE
Edwin P. Brinkel, Royal Oak, Mich., assignor to Ross Operating Valve Company, Detroit, Mich., a corporation of Michigan
Filed Nov. 20, 1959, Ser. No. 854,437
17 Claims. (Cl. 137—620)

This invention relates to safety valves, and more particularly to valve arrangements for use in the fluid control systems of industrial machinery such as punch presses and stamping machines.

It is conventional in fluid control systems for pneumatically operated clutches and brakes of presses, for example, to provide two separated manually actuatable control valves so connected that the operator must engage both valves simultaneously in order to operate the press. Valve constructions have been provided for preventing an operator from "tying down" one of these valves in order to achieve faster press cycling, which would defeat the safety feature of the system. An example of such a safety valve construction is illustrated in Patent No. 2,774,369 of Dominick A. Di Tirro, issued December 18, 1956.

Field operation of previously known valve arrangements of this type has often been unsatisfactory from a number of standpoints. Since it is often difficult for a press operator to shift two widely separated valves at exactly the same time, it is necessary that the "non-tie down valve" or safety valve system allow for a slight discrepancy in operation of the two manual valves without disenabling the operating circuit. Time delay features have been difficult to provide in previous safety valve systems without obtaining erratic performance, especially when low supply pressures are available. The time delay characteristics of known safety valve arrangements have also been affected by the size or volume of the receiver, such as a cylinder chamber for operating the brake or clutch. In constructions which rely upon a balancing of pressure forces, careful machining to close tolerances has been necessitated in order to prevent the possibility of malfunctioning of the safety valve under low pressure conditions.

It is an object of the present invention to overcome the problems presented by previously known non-tie down or safety valve constructions and to provide a novel and improved valve arrangement which can be relied upon to function consistently over a wide range of supply pressures.

It is a further object to provide an improved non-tie down valve of this type which will take into account slight time delays between operation of the two manual valves, and in which the permissible time delay can be preset within wide limits without encountering erratic performance.

It is also an object to provide an improved safety valve construction of this nature which requires a minimum of close machining or small tolerances, and which is not materially affected by variations in the size of the receiver or by friction imbalances among moving parts of the assembly.

It is a further object to provide an improved non-tie down valve having the above characteristics, which will be fully effective to disenable a fluid control system upon failure to simultaneously actuate two manual valves, regardless of the rate of cycling of the system.

Other objects, features, and advantages of the present invention will become apparent from the subsequent description, taken in conjunction with the accompanying drawing.

In the drawing:

The FIGURE is a partially schematic side elevational view in cross-section of the novel non-tie down valve construction shown in conjunction with a pair of manually operable valves and a fluid controlled device.

In general terms, the illustrated embodiment of the invention comprises a double-faced poppet valve having one area responsive to pressure from a pair of manually actuatable valves to open the poppet valve and permit this pressure to pass to a receiver such as an air motor for a press brake or clutch, or a valve for controlling such motor. A pair of check shuttle valves are connected to the two manual valves and to each other in such a manner that both manual valves must be moved to their pressure position before pressure can reach the poppet valve area. If only one manual valve is pressurized while the other is connected to exhaust, the pressure will pass instead to another and larger area of the poppet valve which will hold the poppet valve in its closed position (connecting the receiver to exhaust) despite later pressurization of the first area.

The passage leading to the second poppet valve area is provided with an adjustable restriction and an enlarged volume so that the poppet valve may be held closed only after a predetermined time delay, the poppet valve opening should both manual valves be pressurized before the time has expired. Should the receiver be disenabled by the closed poppet valve, it may be re-enabled only by first moving both manual valves to exhaust, so as to relieve the pressure on the second poppet valve area, the restriction being ineffective while this pressure is being relieved.

Once the poppet valve is opened, a third area will be pressurized, thus maintaining the open position of the poppet valve even after a pressure build-up on the second area. A check valve is provided between the poppet valve outlet and the second poppet valve area, so that immediately upon opening of the poppet valve pressure will be applied to the second area, this pressure thus being in readiness to close the poppet valve immediately upon movement of either or both manual valves to exhaust position. Movement of the poppet valve to its closed position will again connect the receiver to exhaust.

Referring more particularly to the drawing, the safety device is generally indicated at 11 and is adapted to be connected to a pair of spaced-apart manual valves 13 and 14 for controlling a reciprocable air motor 15, such as may be used to operate a clutch or brake for a press. This motor is shown as being connected to a control valve 16 by a conduit 17, the control valve having a supply conduit 18 and an exhaust conduit 19. Control valve 16 is illustrated as being in its exhaust position but is actuatable to a supply position by pressure applied to a conduit 21. Valve 16 will hereinafter be referred to as the receiver, although it will be understood that the pressure in conduit 21 could be directly connected to the motor.

Valve assembly 11 is illustrated as comprising a body or housing 22, this housing having a pair of pilot inlet or entrance ports 23 and 24 connected by conduits 25 and 26 to manual valves 13 and 14, respectively. These manually operated valves, which may hereinafter be referred to as pilot valves, are three-way valves, each having an inlet connection 27 and an exhaust connection 28. Commonly, the valves are each oscillated by pressure on a palm button from their normal exhaust position to their pressure position.

Ports 23 and 24 lead to bores 29 and 31, respectively, these bores being coaxially disposed and connected by a narrower bore or central chamber 32. A ball check valve 33 is disposed within bore 29 and a ball check valve 34 is disposed within bore 31, a spacer 35 being slidably disposed within bore 32 and separating balls 33 and 34. The diameter of the ball valves is somewhat narrower than the diameter of bores 29 and 31, and the length of spacer 32 is such that only one ball valve at a time may rest against its seat. When pressure is applied to port 23 but not to port 24, ball valve 33 will engage a seat 36, preventing fluid flow from bore 29 to bore 32, but ball valve 34 will be held away from its seat 40, thus permitting flow past ball valve 34 from bore 31 to bore 32. Although the diameters of bores 29 and 31 and of ball valves 33 and 34 may be approximately equal to facilitate manufacture and installation, it will not be necessary to machine any of these parts to close tolerances or to maintain identical flow conditions between each ball valve and its corresponding bore. The reasons why discrepancies in flow areas will not affect operation of the safety valve assembly will become apparent from the description of the operation given below. Slight leakage past either ball valve when in its seated position will also not detract from the efficacy of operation as long as the fluid supply is sufficient to replenish such leakage and maintain pressure in the system.

A double-faced poppet valve 37 is slidably mounted in a bore 38 within housing 22. This valve has a portion 39 adapted to engage a seat 41 to define the closed or disenabling position of the valve. A passageway 42 leads from central chamber 32 to seat 41, so that fluid pressure in bore 32 will urge a predetermined area on valve 37 to its open or operative position. When in this position, passage 42 will be open to a laterally extending passage 43, which leads to a working port 44 connected to conduit 21. In its open position, pressure will act on valve portion 39 to hold the valve in its open position. An exhaust port 45, which is connected to passage 43 when valve 37 is in its disenabling position, will be cut off from this passage when valve portion 39 engages seat 46 upon arrival at its operative position. The seal diameter of seat 46 is greater than that of seat 41, so that a greater force will hold valve 37 in its open position than will originally urge it toward that position.

A pair of passages 47 and 48 lead transversely from bores 29 and 31 respectively, these passages being connected at all times to their respective entrance ports 23 and 24 regardless of the position of ball valves 33 and 34. Passages 47 and 48 lead to opposite sides of a spherical pass shuttle valve 49. This valve is engageable with either of a pair of seats 51 and 52 connected to passages 47 and 48, respectively. If pressure exists in passage 47 but not in passage 48, ball valve 49 will seat against seat 52 so that fluid may not enter passage 48. Likewise, with pressure in passage 48 but not in passage 47, valve 49 will engage seat 51 to prevent fluid flow into passage 47.

A passage 53 leads laterally from pass shuttle chamber 54 within which valve 49 is disposed to a larger chamber 55 which in turn is connected to a tapering chamber 56 and a passage 57. A metering valve 58 is disposed within chamber 56 and is urged toward the narrow end of this chamber by a spring 59 disposed within chamber 55. The outer end of valve 58 engages a rod 61 extending through passage 57, this rod being axially adjustable by a member 62 threaded into housing 22. It will thus be seen that when fluid flows from pasage 53 through chambers 55 and 56 to passage 57, this fluid will flow at a restricted rate depending upon the position of rod 61 and valve 58. With fluid flowing in the opposite direction however, valve 58 will leave rod 61 and compress spring 59, opening the restriction and permitting unrestricted flow back to passage 53. When safety device 11 is installed in the field, member 62 will normally be accessible only by authorized personnel, for reasons which will become apparent.

Passage 57 leads to a lateral passage 63, which in turn leads to a larger chamber 64 which might be termed a time delay chamber. Valve 37 carries a piston portion 65 with an O-ring 66, the diameter of bore 38 within which the O-ring slides being such as to create an effective pressure area urging valve 37 towards its disenabling or closed position which is greater than the pressure area inside seat 41 on valve portion 39 urging the valve toward its open position but no greater than the area inside seat 46 which defines the force holding valve 37 open. It will thus be seen that if fluid pressure builds up on piston area 65 before it is applied to valve portion 39 within seat 41, valve 37 will remain in its closed position even after full opening pressure is exerted. However, once the open position of valve 37 has been attained, pressure on piston area 65 will not be capable of returning it to its disenabling position until the force holding it open is reduced.

A by-pass 67 leads from passage 43 adjacent port 44 to a check valve 68, and past the check valve through a passage 69 which is connected with volume 64. Pressure in passage 67 above that in passage 69 will cause check valve 68 to move upwardly to an open position, permitting fluid flow into chamber 64 to immediately build up the pressure in this chamber. Check valve 68, however, will not permit fluid flow from chamber 64 to passage 43.

In operation of the safety mechanism, assuming an initial condition in which both valves 13 and 14 are in their exhaust positions, the safety valve components will be as shown in the figure. Should both valves 13 and 14 be operated simultaneously to their supply positions, fluid will flow into ports 23 and 24 and past one or both of ball valves 33 and 34 to chamber 32. The ball valves will assume a position depending upon the relative flow characteristics past the two ball valves. If the valves and their passages are of identical size, the valves may be symmetrically positioned with respect to their seats. In any case, however, one valve or the other will be lifted from its respective seat because of spacer 35, so that pressure will always be applied to passage 42 when both ports 23 and 24 are pressurized.

This pressure in passage 42 will be immediately exerted on the underside of valve portion 39 and will lift this valve to its operative or open position. The fluid will then pass through passage 43 and port 44 to working conduit 21, shifting valve 16 to its supply position and thereby operating motor 15.

At the same time, fluid will enter chamber 64 by two different paths. Fluid will pass through passages 47 and 48 and past valve 49 to metering valve 58, from where it will flow at a metered rate into bore 63 and passage 64. This flow will occur, of course, regardless of the position of valve 37; however, since it will take a predetermined time for the pressure to build up on piston 65 because of metering valve 58 and the volume of chamber 64, valve 37 will open before the pressure has built up sufficiently on piston 65 if fluid pressure is first exerted on valve portion 39.

The second source of fluid for chamber 64 will be through check valve 68 which will open as soon as fluid flows into passage 43. Normally, the flow past check valve 68 will be unrestricted compared with that past metering valve 58, so that the full pressure will be built up on piston 65 immediately after valve 37 reaches its open position. At this point, however, fluid pressure will be exerted on valve portion 39 which is at least equal to that on piston 65, as described above, so that the valve will be held in its open position.

The purpose of the rapid buildup of pressure on piston 65 through check valve 68 is to assure immediate return of valve 37 to its disenabling position no matter how rapidly one or both of valves 13 and 14 are returned to their exhaust positions. Assuming that both valves are simultaneously returned to exhaust, even though this is immediately after valve 37 has opened, pressure on the underside of valve portion 39 will be immediately reduced, and the pressure in chamber 64 will be reduced by passage of fluid past metering valve 58 and valve 49 to either or both of ports 23 and 24. Metering valve 58 will move to a fully opened position during this flow, but the volume of chamber 64 and the difference in flow paths are such that the pressure on piston 65 will not drop as fast as that on valve portion 39, and valve 37 will therefore shift to its closed position. This will, of course, connect exhaust port 45 to working port 44, permitting valve 16 to shift to its exhaust position and thereby exhausting motor 15. The valve will then be in readiness for another cycle.

In all likelihood the operator will not release both palm buttons at exactly the same time. Assuming for example that valve 13 is returned first, valve 49 will immediately engage seat 51 to prevent reduction of pressure on piston 65, while fluid will flow from passage 42 past valve 33 to exhaust, thus causing return of valve 37. Valve 33 will of course be opened by pressure in passage 42 as well as by setting of valve 34 due to pressure in conduit 26.

Should valve 13 be tied down in its supply position in an attempt to operate motor 15 solely by valve 14, pressure will pass through passage 47 and past valve 49 and metering valve 58 to chamber 64, building up pressure on piston 65 and holding valve 37 in its closed position. No pressure will be built up in passage 42 or on the underside of valve portion 39, since valve 33 will engage its seat 36, preventing any fluid from flowing into chamber 32. It should also be noted that valve 49 will engage its seat 52, thus preventing escape of fluid from passage 47 to port 24. Later operation of valve 14 to its supply position will not open valve 37, since any pressure applied to the underside of valve portion 39 will be counteracted by pressure exerted on piston 65 which has a larger exposed area. It is immaterial whether valve 34 shifts to its closed position after valve 14 is actuated, or whether valves 33 and 34 assume some intermediate position. In order to re-enable the apparatus, it will be necessary to connect both valves 13 and 14 to exhaust, thereby relieving the pressure in chamber 64.

The same situation will occur if it is attempted to tie down valve 14 in its supply position. In this case, valve 34 will engage its seat 40, and valve 49 will engage its seat 51, so that pressure will pass through passages 48 and 53, past metering valve 58 to chamber 64 to hold valve 37 in its closed position despite a later attempt to pressurize the underside of valve portion 39 by moving valve 13 to its supply position. Here again, both valves 13 and 14 must be connected to exhaust before the device will again be operative.

In normal operation, the operator will attempt to shift valves 13 and 14 simultaneously to their supply positions for each operational cycle, but due to the wide spacing between these valves and ordinary human limitations of muscular coordination, the valves will be shifted a slight time interval apart. The present invention includes means for allowing for such a time discrepancy in a consistent and selective manner and permitting full operational control of motor 15 despite such unintentional timing delays.

Assuming, for example, that valve 13 is first moved to its supply position, valve 33 will close, preventing pressure buildup in passage 42, while valve 49 shifts to engage valve seat 52 and permit pressure buildup in chamber 64 past metering valve 58. During the initial portion of this pressure buildup, the pressure on piston 65 will not be sufficient to prevent opening of valve 37 should full pressure be applied to passage 42 and the underside of valve portion 39. During this interim period, should the operator shift valve 14 to its supply position, pressure will immediately be transmitted to passage 42 and to the underside of valve portion 39 to shift valve 37 to its open or operative position. Again, this will occur despite the positions of valves 33 and 34, since with pressure at both ports 23 and 24, it is assured that pressure will be transmitted to passage 42. This interim period may be preselected by adjusting threaded member 62 and thereby the position of metering valve 58, or by preselecting the size of chamber 64. It will be noted in this respect that a larger size for chamber 64 will decrease the sensitivity of adjustment of metering valve 64 and will ordinarily also reduce the machining accuracy required for the metering valve components. Once valve 37 shifts to its open position, the pressure on the larger area of underside of valve portion 39 (as defined by seat 46) will prevent closing of the valve upon the attainment of full pressure in chamber 64.

As an additional safety precaution, a conduit 71 could be provided leading to counterbore 72 within which head 73 of threaded member 62 is disposed, this counterbore being vented. More specifically, the connection of conduit 71 with counterbore 72 could be located between a pair of seals 74 and 75 carried by head 73, so that this conduit is normally sealed off. Should member 62 be removed from the housing, bore 32 would thus automatically be connected to exhaust preventing pressurization of conduit 21.

Because of the novel constructional features of the safety valve assembly, it will operate with full efficiency and reliability throughout a large range of pressures. Particularly at lower pressures, the absence of any reliance on pressure balancing between opposed flow areas in the valve assembly will mean that the time delay will be substantially constant and that recycling with one of the valves 13 or 14 held in its supply position will be prevented. Since only one valve member, that is valve 37, is shifted to enable or disenable the circuit, no malfunction is likely even at low pressures because of a possible unbalance between the frictional forces of two opposing members.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a safety mechanism for use in conjunction with a pair of manually actuatable valves and a fluid control device, a safety valve movable between a first position disenabling said device and a second position enabling said device, means responsive to simultaneous actuation of both manual valves for urging said safety valve toward its second position, and normally inactive means responsive to actuation of only one of said manual valves for urging said safety valve toward its first position.

2. In a device for controlling fluid delivered from a pair of manual valves to a fluid receiver, a safety valve reciprocable between an operative position permitting fluid flow from said manual valves to said receiver and a disenabling position preventing such flow, a first area on said safety valve for urging the safety valve toward its operative position, passageway means connecting the outlets of said manual valves to said first area, means responsive to a discrepant position between said manual valves for closing said passageway means, a second area on said safety valve larger than the first area for urging the valve toward its disenabling position, and second passageway means connecting the outlets of said manual valves to said second area.

3. In a device for controlling fluid delivered from a pair of manual valves to a fluid receiver, a safety valve reciprocable between an operative position permitting fluid flow from said manual valves to said receiver and a disenabling position preventing such flow, a first area on said safety valve for urging the safety valve toward its operative position, passageway means connecting the outlets of said manual valves to said first area, means responsive to a discrepant position between said manual valves for closing said passageway means, a second area on said safety valve larger than the first area for urging the valve toward its disenabling position, second passageway means connecting the outlets of said manual valves to said second area, and a restriction in said second passageway means.

4. In a device for controlling fluid delivered from a pair of manual valves to a fluid receiver, a safety valve reciprocable between an operative position permitting fluid flow from said manual valves to said receiver and a disenabling position preventing such flow, a first area on said safety valve for urging the safety valve toward its operative position, passageway means connecting the outlets of said manual valves to said first area, means responsive to a discrepant position between said manual valves for closing said passageway means, a second area on said safety valve larger than the first area for urging the valve toward its disenabling position, second passageway means connecting the outlets of said manual valves to said second area, and a chamber connected to said second area whereby full pressure will be applied to the second area after a predetermined time lapse.

5. In a device for controlling fluid delivered from a pair of manual valves to a fluid receiver, a safety valve reciprocable between an operative position permitting fluid flow from said manual valves to said receiver and a disenabling position preventing such flow, a first area on said safety valve for urging the safety valve toward its operative position, passageway means connecting the outlets of said manual valves to said first area, means responsive to a discrepant position between said manual valves for closing said passageway means, a second area on said safety valve larger than the first area for urging the valve toward its disenabling position, second passageway means connecting the outlets of said manual valves to said second area, a restriction in said second passageway means, means for removing said restriction in response to fluid flow from said second area to either of said manual valves, and a chamber of predetermined volume connected to said second area.

6. In a device for controlling fluid delivered from a pair of manual valves to a fluid receiver, a safety valve reciprocable between an operative position permitting fluid flow from said manual valves to said receiver and a disenabling position preventing such flow, a first area on said safety valve for urging the safety valve toward its operative position, passageway means connecting the outlets of said manual valves to said first area, means responsive to a discrepant position between said manual valves for closing said passageway means, a second area on said safety valve larger than the first area for urging the valve toward its disenabling position, second passageway means connecting the outlets of said manual valves to said second area, a chamber of predetermined volume connected to said second area, and one-way passageway means connecting the outlet of said safety valve and said chamber to permit fluid flow to the chamber in response to movement of the safety valve to its operative position.

7. In a device for controlling fluid flow between a pair of manual valves movable between supply and exhaust positions and an outlet port, first passageway means between said manual valve outlets and said outlet port, a safety valve movable between an operative position opening said first passageway means and a disenabling position closing said first passageway means connecting said outlet port to exhaust, a first area on said safety valve responsive to pressure from either of said manual valves for urging the safety valve toward its operative position, means responsive to discrepant positions between said manual valves for preventing application of pressure to said first area, a second area on said safety valve for holding the safety valve in its disenabling position, second passageway means connecting the outlets of said manual valves to said second area, means for retarding pressure buildup on said second area, and a third area on said safety valve pressurizable in response to movement of the safety valve to its operative position for maintaining the safety valve in its operative position and counteracting pressure on said second area.

8. In a device for use in conjunction with a pair of manual valves movable between supply and exhaust positions and connected in parallel to a delivery port, a pair of opposed entrance ports connected to the outlets of said manual valves and connected by a central chamber, a passageway leading from said central chamber to said delivery port, a pair of one-way check valves disposed between each of said entrance ports and said central chamber, each of said valves being urged toward its closed position by pressure at its corresponding entrance port, means responsive to pressure simultaneously applied at both entrance ports for causing at least one of said check valves to remain open, a safety valve in the passageway connecting said central chamber and said delivery port, a first area on said safety valve responsive to pressure in said central chamber for urging the safety valve toward an open position, a second area on said safety valve for urging the safety valve toward its closed position, and constantly open passageway means connecting each of said entrance ports with said second area.

9. In a device for use in conjunction with a pair of manual valves movable between supply and exhaust positions and a delivery port, a pair of oppositely disposed entrance ports connected to the outlets of said manual valves, a pair of check valves disposed in said entrance ports, a spacer between said check valves, a central chamber connecting said entrance ports, said check valves and spacer being responsive to pressure in either entrance port to close the connection between such entrance port and central chamber and being responsive to pressure at both entrance ports for connecting at least one entrance port to the central chamber, a first passageway leading from said central chamber to said delivery port, a safety valve movable between an operative position opening said first passageway and a disenabling position closing said passageway, a first area on said safety valve connected to said central chamber for urging the safety valve toward its operative position, a second area on said safety valve larger than said first area for urging the safety valve toward its disenabling position, connections from each of said entrance ports to said second area, and means for preventing fluid flow from one entrance port to the other entrance port through said second passageway means.

10. The combination according to claim 9, said last-mentioned means comprising a pass shuttle chamber, a pair of conduits leading from said entrance ports to opposite sides of said pass shuttle chamber, a conduit leading from said pass shuttle chamber to said second area, and a pass shuttle valve disposed in said pass shuttle chamber and responsive to discrepant pressure conditions in said pair of conduits to prevent fluid flow between said pair of conduits.

11. In a device for use in conjunction with a pair of manual valves movable between supply and exhaust positions and a delivery port supplied by said valves, a first passageway connecting the outlets of said manual valves with said delivery port, a safety valve movable between a first position opening said passageway and a second position closing said passageway, means responsive to discrepant positions between said valves for preventing pressure application to said first passageway and responsive to movement of both valves to their supply position for applying pressure to said first passageway, first means responsive to pressure in said first passageway for urging said safety valve toward its first position, second means responsive to movement of either manual valve to its supply position for urging said safety valve toward its closed position, a metering restriction between said manual valves and said second means comprising a member spring-urged in one direction, and an adjustable stop for limiting the movement of said member in said one direction, said member being responsive to fluid flow away from said second means to move away from said stop against said spring, whereby said restriction will be enlarged.

12. In a device of the class described, a pair of entrance ports each adapted to be connected independently to supply or exhaust, a central chamber connecting said two entrance ports, means responsive to discrepant pressure conditions between said entrance ports for preventing fluid flow to said central chamber and responsive to pressure applied to both entrance ports for admitting pressure to said central chamber, a delivery port, a first passageway between said central chamber and said delivery port, an exhaust port, a safety valve reciprocable between an operative position opening said first passageway and a disenabling position connecting said delivery and exhaust ports and closing said first passageway, a first area on said safety valve responsive to pressure in said central chamber to urge the safety valve toward its operative position, a second area on said safety valve larger than said first area for urging the safety valve toward its disenabling position, second passageway means separate from said central chamber connecting said entrance ports to said second area, means for retarding pressure build-up on said second area, and a third area on said safety valve exposable to central chamber pressure in response to movement of said safety valve to its operative position, whereby pressure on said second area will be counteracted to maintain the safety valve in its operative position.

13. The combination according to claim 12, further provided with a check valve passageway permitting flow only from said delivery port to said second area.

14. The combination according to claim 12, said retarding means comprising a one-way metering valve.

15. In a device for use in conjunction with a pair of manual valves movable between supply and exhaust positions and a delivery port supplied by said valves, a first passageway connecting the outlets of said manual valves with said delivery port, a safety valve movable between a first position opening said passageway and a second position closing said passageway, means responsive to discrepant positions between said valves for preventing pressure application to said first passageway and responsive to movement of both valves to their supply position for applying pressure to said first passageway, first means responsive to pressure in said first passageway for urging said safety valve toward its first position, second means responsive to movement of either manual valve to its supply position for urging said safety valve toward its closed position, a metering restriction between said manual valves and said second means comprising a member spring-urged in one direction, an adjustable stop for limiting the movement of said member in said one direction, said member being responsive to fluid flow away from said second means to move away from said stop against said spring, whereby said restriction will be enlarged, and means responsive to removal of said adjustable stop for preventing pressure application to said first passageway.

16. The combination according to claim 15, said last-mentioned means comprising a vent connection for said first passageway, said adjustable stop having a portion closing said vent connection when the adjustable stop is in its operative position and opening said vent connection when the adjustable stop is removed.

17. In a device for controlling fluid delivered from a pair of manual valves to a fluid receiver, a safety valve reciprocable between an operative position permitting fluid flow from at least one of said manual valves to said receiver and a disenabling position preventing such flow, a first area on said safety valve for urging the safety valve toward its operative position, first passageway means for connecting the outlet of at least one of said manual valves to said first area, a second area on said safety valve larger than said first area for urging the valve toward its disenabling position, second restricted passageway means for connecting the outlet of at least one of said manual valves to said second area, means for preventing application of pressure to said first passageway means before application of pressure to said second passageway means, and means for preventing release of pressure from said second passageway means before release of pressure from said first passageway means.

References Cited in the file of this patent

UNITED STATES PATENTS

| 2,451,010 | Yanchenko | Oct. 12, 1948 |
| 2,774,369 | Di Tirro | Dec. 18, 1956 |
| 2,974,637 | Holmes et al. | Mar. 14, 1961 |
| 2,986,121 | Nowock | May 30, 1961 |